(12) United States Patent
Tang et al.

(10) Patent No.: US 7,689,710 B2
(45) Date of Patent: Mar. 30, 2010

(54) METHOD AND SYSTEM FOR A FRONT-END MODULAR TRANSMISSION CONTROL PROTOCOL (TCP) HANDOFF DESIGN IN A STREAMS BASED TRANSMISSION CONTROL PROTOCOL/INTERNET PROTOCOL (TCP/IP) IMPLEMENTATION

(75) Inventors: Wenting Tang, Mountain View, CA (US); Ludmila Cherkasova, Sunnyvale, CA (US); Lance Warren Russell, Hollister, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2434 days.

(21) Appl. No.: 09/880,632

(22) Filed: Jun. 12, 2001

(65) Prior Publication Data

US 2002/0188753 A1     Dec. 12, 2002

(51) Int. Cl.
*G06F 15/16* (2006.01)
*G06F 15/177* (2006.01)
*G06F 15/173* (2006.01)

(52) U.S. Cl. .................... 709/237; 709/222; 709/223; 709/227; 709/228

(58) Field of Classification Search ................ 709/201, 709/227, 223, 232, 235, 238, 244
See application file for complete search history.

(56) References Cited

U.S. PATENT DOCUMENTS

| | | | | |
|---|---|---|---|---|
| 5,774,660 A * | 6/1998 | Brendel et al. | ............. | 709/201 |
| 6,006,264 A * | 12/1999 | Colby et al. | ............. | 709/226 |
| 6,088,728 A * | 7/2000 | Bellemore et al. | .......... | 709/227 |
| 6,742,044 B1 * | 5/2004 | Aviani et al. | .............. | 709/235 |
| 6,775,692 B1 * | 8/2004 | Albert et al. | .............. | 709/207 |
| 6,826,613 B1 * | 11/2004 | Wang et al. | .............. | 709/227 |
| 2002/0056006 A1 * | 5/2002 | Vange et al. | .............. | 709/235 |
| 2002/0103857 A1 * | 8/2002 | Soderberg et al. | .......... | 709/203 |
| 2002/0143954 A1 * | 10/2002 | Aiken et al. | .............. | 709/227 |

OTHER PUBLICATIONS

Vivek Pai et al., Locality-Aware Request Distribution in Cluster-based Network Servers, ACM, 1998, pp. 1-12.*
Andrew Tanenbaum, "Computer Network: Third Edition,", Prentice Hall, New Jersey, 1996, pp. 529-533.*
Vivek S. Pai, Mohit Aron, Gaurav Banga, Michael Svendsen, Peter Druschel, Willy Zwaenepoel and Erich Nahum, Locality-Aware Request Distribution in Cluster-Based Network Servers, Department of Electrical and Computer Engineering, Rice University, Department of Computer Science, Rice University, IBM T.J. Watson Research Center.

* cited by examiner

*Primary Examiner*—Ario Etienne
*Assistant Examiner*—Gregory G Todd

(57) ABSTRACT

A method and system for handing-off TCP states in a communication network. Specifically, the present invention discloses allows for transferring TCP states between front-end node and a plurality of back-end web servers. The handoff occurs between dynamically loadable modules that wrap around the TCP/IP stack located at a front-end node and a selected back-end web server. A handoff protocol implemented by the loadable modules works within the kernel level of the existing TCP/IP code. As such, no changes to the existing TCP/IP code is necessary. The loadable modules at the front-end are able to select a back-end web server depending on the HTTP request, coordinate handing off TCP states, and forward packets to the back-end web server. Loadable modules at the selected back-end modify response packets going out to reflect the proper TCP state of the front-end node.

29 Claims, 10 Drawing Sheets

METHOD AND SYSTEM FOR A FRONT-END MODULAR TRANSMISSION CONTROL PROTOCOL (TCP) HANDOFF DESIGN IN A STREAMS BASED TRANSMISSION CONTROL PROTOCOL/INTERNET PROTOCOL (TCP/IP) IMPLEMENTATION

BACKGROUND OF THE INVENTION

1. Field of the Invention

The present invention relates to the field of STREAMS-based Transmission Control Protocol/Internet Protocols (TCP/IP) protocols. Specifically, the present invention relates to the field of modular implementation of a TCP handoff protocol in order to facilitate the transfer or migration of TCP states from one node to another node in a communication network. The present invention further relates to the field of content-aware request distribution in a web server cluster.

2. Related Art

Web server clusters are the most popular configurations used to meet the growing traffic demands imposed by the Internet. However, for web server clusters to be able to achieve scalable performance, when the cluster size increases, it is imperative that the cluster employs some mechanism and/or policy for balanced request distribution. For instance, it is important to protect the web server clusters from overload and to provide service differentiation when different client requests compete for limited server resources. Mechanisms for intelligent request distribution and request differentiation help to achieve scalable and predictable cluster performance and functionality, which are essential for today's Internet web sites.

Traditional request distribution methods try to distribute the requests among the nodes in a web cluster based on certain parameters, such as, IP addresses, port numbers, and network load information. Some of these request distribution methods have the ability to check the packet header up to Layer 4 in the International Organization for Standardization Open Systems Interconnection (ISO/OSI) network reference model (e.g., TCP/IP) in order to make the distribution decision. As such, these methods are commonly referred to as Layer 4 request distributions.

FIG. 1 shows a communication network 100 of the prior art that illustrates a load balancing solution. In FIG. 1, a web server cluster 150 is shown. The cluster 150 can be a web site with a virtual IP address located at the load balancer 152. Various back-end web servers, such as back-end web server-1 155, back-end web server-2 157, on up to back-end web server-n 159 contain the content provided by the web site.

Typically, the load-balancer 152 sits as a front-end node on a local network and acts as a gateway for incoming connections. The load balancer 152 is also called a request distributor 152. Requests for content can come through the Internet 120 from various clients, such as client-1 110, client-2 112, on up to client-n 114. Incoming client requests are distributed, more or less, evenly to the pool of back-end web servers, without regard to the requested content. Further, the load balancer 152 forwards client requests to selected back-end nodes prior to establishing the connection with the client.

In this configuration, the web server cluster 150 appears as a single host to the clients. To the back-end web servers in a web cluster 150, the front-end load-balancer 152 appears as a gateway. In essence, it intercepts the incoming connection establishment packets and determines which back-end web server should process a particular request. Proprietary algorithms implemented in the front-end load balancer 152 are used to distribute the requests. These algorithms can take into account the number of back-end web servers available, the resources (CPU speed and memory) of each back-end web server, how many active TCP sessions are being serviced, etc. The balancing methods across different load-balancing servers vary, but in general, requests are forwarded to the least loaded back-end web server in the cluster 150.

In addition, only the virtual address located at the load balancer 152 is advertised to the Internet community, so the load balancer also acts as a safety net. The IP addresses of the individual back-end web servers are never sent back to the web browser located at the client making a request, such as client 110. The load-balancer rewrites the virtual cluster IP address to a particular web server IP address using Network Address Translation (NAT).

However, because of this IP address rewriting, both inbound requests and outbound responses must pass through the load-balancer 152. This creates a bottleneck and limits the scalability of the system.

Another solution for request distribution is illustrated by the Brendel et al. (U.S. Pat. No. 5,774,660) by Resonate, Inc. In Brendel et al., a load balancer examines the content of the web request to provide for better efficiency in processing requests. However, the Brendel et al. patent platform weaves a proprietary protocol within the TCP/IP protocol of an operating system of the load balancer. As a result, the algorithm utilized by the Brendel et al. patent necessitate kernel source modifications when porting from one operating system to another.

Also, in the Brendel et al. patent the proprietary protocol is applied at the application layer of the operating system of the load balancer. Incoming packets to the load balancer have their protocol changed from TCP to a non-TCP (IXP) standard that is only understood by the proprietary protocol located at the application layer. Later, the packets have their packets changed back to the TCP protocol for transmission to the back-end servers. Thus, the Brendel et al. patent reduces processing efficiency by switching back and forth between user level kernels. Further, were the Brendel et al. patent to be implemented at the operating system's kernel level, any modifications made to the proprietary protocol would necessarily require access to the kernel source file which typically is not available.

Thus, a need exists for more flexibility in designing and implementing a TCP/IP handoff mechanism in a web server cluster. Another need exists for a TCP/IP handoff mechanism that is more portable between different operating systems implementing the TCP/IP protocol. Still another need exists for better efficiency in performing TCP/IP handoff mechanisms.

SUMMARY OF THE INVENTION

Accordingly, a method and system for a method and system for a front-end modular Transmission Control Protocol (TCP) handoff design in a STREAMS-based Transmission Control Protocol/Internet Protocol (TCP/IP) implementation is described. Embodiments of the present invention provide for better management flexibility as TCP handoff (STREAMS) modules can be dynamically loaded and unloaded as dynamically loadable kernel modules (DLKM) without service interruption. In addition, embodiments of the present invention meet the above need as well as providing better portability between different operating systems since the TCP handoff modules can be ported to other STREAMS-enabled operating systems implementing the TCP/IP protocol. Also, embodiments of the present invention meet the above needs as well as providing for upper layer transparency in that no application modifications are necessary to take advantage of new solutions: modification are made at the kernel level in the DLKM TCP handoff modules possibly without shutting down the operating system. Further, embodiments of the present invention meet the above needs as well as providing for better efficiency in processing HTTP requests since the handoff modules only peek into message traffic with minimum functional replication of the original TCP/IP modules.

These and other objects and advantages of the present invention will no doubt become obvious to those of ordinary skill in the art after having read the following detailed description of the preferred embodiments which are illustrated in the various drawing figures.

Specifically, the present invention discloses a method and system for TCP handoff in a web cluster that includes a front-end node coupled to a plurality of back-end web servers. The web cluster can be a web site where the front-end node provides a virtual IP address for the web cluster. The content might be partitioned or replicated between each of the back-end web servers. The back-end web servers may be coupled to the front-end node by a local area network. The web cluster is coupled to a communication network, such as the Internet.

The process begins by establishing a connection between a client web browser and the front-end node. The Bottom TCP (BTCP) handoff (STREAMS) module located below a TCP module in the operating system at the front-end node makes the connection with the client. The front-end BTCP handoff module stores the connection setup messages for later TCP state migration purposes. The TCP module at the front-end node does not participate in making the connection or handing off of the TCP state.

The connection establishes a communication session between the client and the BTCP handoff module at the front-end node for the transfer of data contained within the content at the web site.

After the connection is made, the client sends a HTTP request to the BTCP handoff module at the front-end node. The BTCP handoff module parses the HTTP request by examining the content of the HTTP request to determine which of the back end servers is capable of or is most appropriate for processing the request. For example, the selected back-end web server contains the resources required by the HTTP request.

At this point, TCP state migration is made from the BTCP handoff module at the front-end node to the selected back-end web server containing the requested resources. The TCP state migration process occurs transparently to the client.

After successful migration of the TCP state to the selected back-end web server, a bottom IP (BIP) module in the front-end node switches to a forwarding mode, where packets received from the client are quickly forwarded to the selected back-end web server.

The purpose of the TCP state migration is to allow the selected back-end web server to act like the front-end node, actually the BTCP module at the front-end, for purposes of the communication session. The BTCP module at the selected back-end web server is able to change headers in outgoing packets from the back-end web server such that it appears that the source of the packets is the front-end node in its proper TCP state for the communication session.

After completely processing the HTTP request, the selected back-end web server terminates the communication session. In order to free the connection at all the nodes, the BTCP handoff module at the selected back-end intercepts the TCP control packets, including the RST and FIN packets, and sends them to the BTCP module at the front-end node. The BTCP module at the front-end then sends the TCP control packets to the client. In this way, the connection is terminated at all the nodes, including the client node, the front-end node, and the selected back-end web server.

In another embodiment of the present invention, the TCP state migration process includes storing the TCP/IP SYN packet sent from said client to said front-end node to request a connection. The response TCP/IP SYN/ACK packet is sent from the front-end BTCP handoff module back to the client. An ACK packet from the client is also stored.

In order to handoff the TCP state to the selected back-end web server, the BTCP module at the front-end node replays the original TCP/IP SYN packet at the selected back-end web server. To the selected back-end web server it appears that a connection is being requested by a client.

Contained within the TCP/IP SYN packet is the initial TCP sequence number of the BTCP module at the front-end node. The handoff protocol used by the handoff modules allows the BTCP handoff module at the back-end web server to read the information and update outgoing packets appropriately, so that the source of the outgoing packets appears to be the front-end node in the proper TCP state for the communication session.

To complete the extension of the connection, the back-end web server sends a TCP/IP SYN/ACK packet back to the front-end node. The BTCP module at the selected back-end updates the TCP/IP SYN/ACK packet to reflect the initial TCP sequence number of the BTCP module at the front-end node. An ACK packet is sent from the BTCP module at the front-end node back to the selected back-end web server in order to extend the connection. This ACK packet is identical to the original ACK packet sent from the client except for changing the destination address to the selected back-end web server.

BRIEF DESCRIPTION OF THE DRAWINGS

PRIOR ART

DETAILED DESCRIPTION OF THE INVENTION

Figure 1:
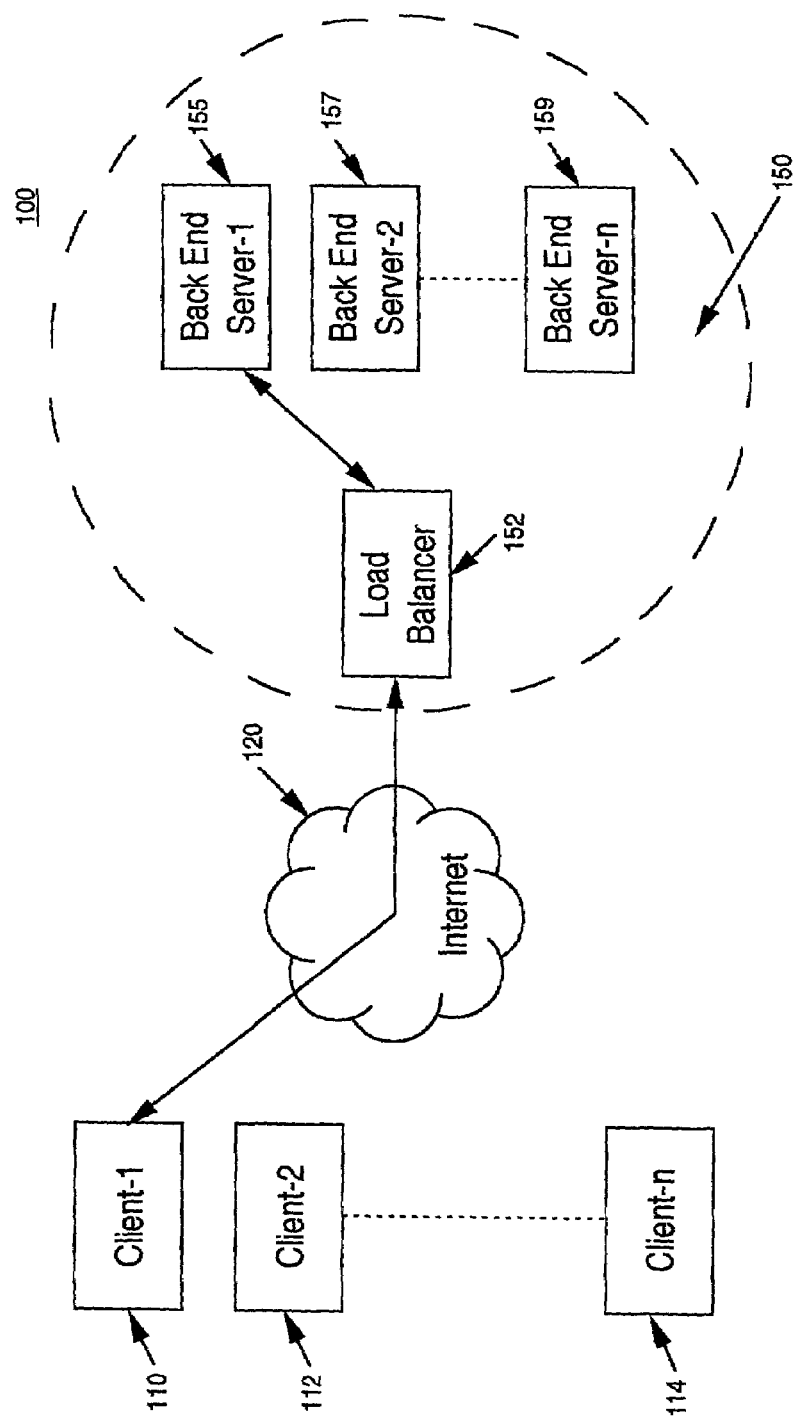
FIG. 1 illustrates a block diagram of an exemplary communication network implementing traditional load balancing solutions.

Reference will now be made in detail to the preferred embodiments of the present invention, a method and system for implementing TCP handoff in a STREAMS-based TCP/IP implementation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details.

A method and system for a method and system for a front-end modular Transmission Control Protocol (TCP) handoff design in a STREAMS-based Transmission Control Protocol/Internet Protocol (TCP/IP) implementation is described. Embodiments of the present invention provide for better management flexibility as TCP handoff (STREAMS) modules can be dynamically loaded and unloaded as dynamically loadable kernel modules (DLKM) without service interruption. In addition, embodiments of the present invention meet the above need as well as providing better portability between different operating systems since the TCP handoff modules can be ported to other operating systems with STREAMS-based TCP/IP implementation. Also, embodiments of the present invention meet the above needs as well as providing for upper layer transparency in that no application modifications are necessary to take advantage of new solutions: modification are made at the kernel level in the DLKM TCP handoff modules without accessing operating system source files. Further, embodiments of the present invention meet the above needs as well as providing for better efficiency in processing HTTP requests since the handoff modules only peek into message traffic with minimum functional replication of the original TCP/IP modules.

Content Aware Request Distribution

Content-aware request distribution takes into account the content (URL name, URL type, or cookies, etc.) when making a decision as to which back-end web server can best process the HTTP request. Content-aware request distribution mechanisms enable smart, specially tailored routing inside the web cluster.

Some benefits achieved in content-aware request distribution include allowing only partial replication of the content for a web site. Most, if not all, of the content provided by a web site server cluster can be partitioned. Additionally, the web site can further partition content based on specialization of information. For example, dedicated back-end web servers can be set up to deliver different types of documents. Another benefit provided by content-aware distribution includes support for differentiated Web Quality of Service (Web QoS).

Content-aware request distribution can significantly improve the web cluster throughput. Content-aware request distribution based on cache affinity lead to significant performance improvements compared to the strategies taking into account only load information.

Three main components comprise a web server cluster configuration in implementing a content-aware request distribution strategy: a dispatcher, a distributor, and a web server. The dispatcher implements the request distribution strategy and decides which web server will be processing a given request. The distributor interfaces with the client and implements the TCP handoff in order to distribute the client requests to a specific web server. The web server processes the client web requests, otherwise known as HTTP requests.

In the internet environment, the hypertext transfer protocol (HTTP) protocol is based on the connection-oriented TCP protocol. In order to serve a client request (HTTP request packet), a TCP connection is first established between a client and the front-end node. A dispatcher component is accessed by the front-end node to determine which web server can process the HTTP request. The dispatcher component may be located at the front-end node or can be located at on a separate node.

In the present invention, the front-end node does not serve the HTTP request. Therefore, some mechanism is needed to forward the HTTP request for processing to the right node in the web cluster. Embodiments of the present invention utilize the STREAMS-based front-end modular TCP handoff mechanism to support content-aware request distribution.

Figure 2:
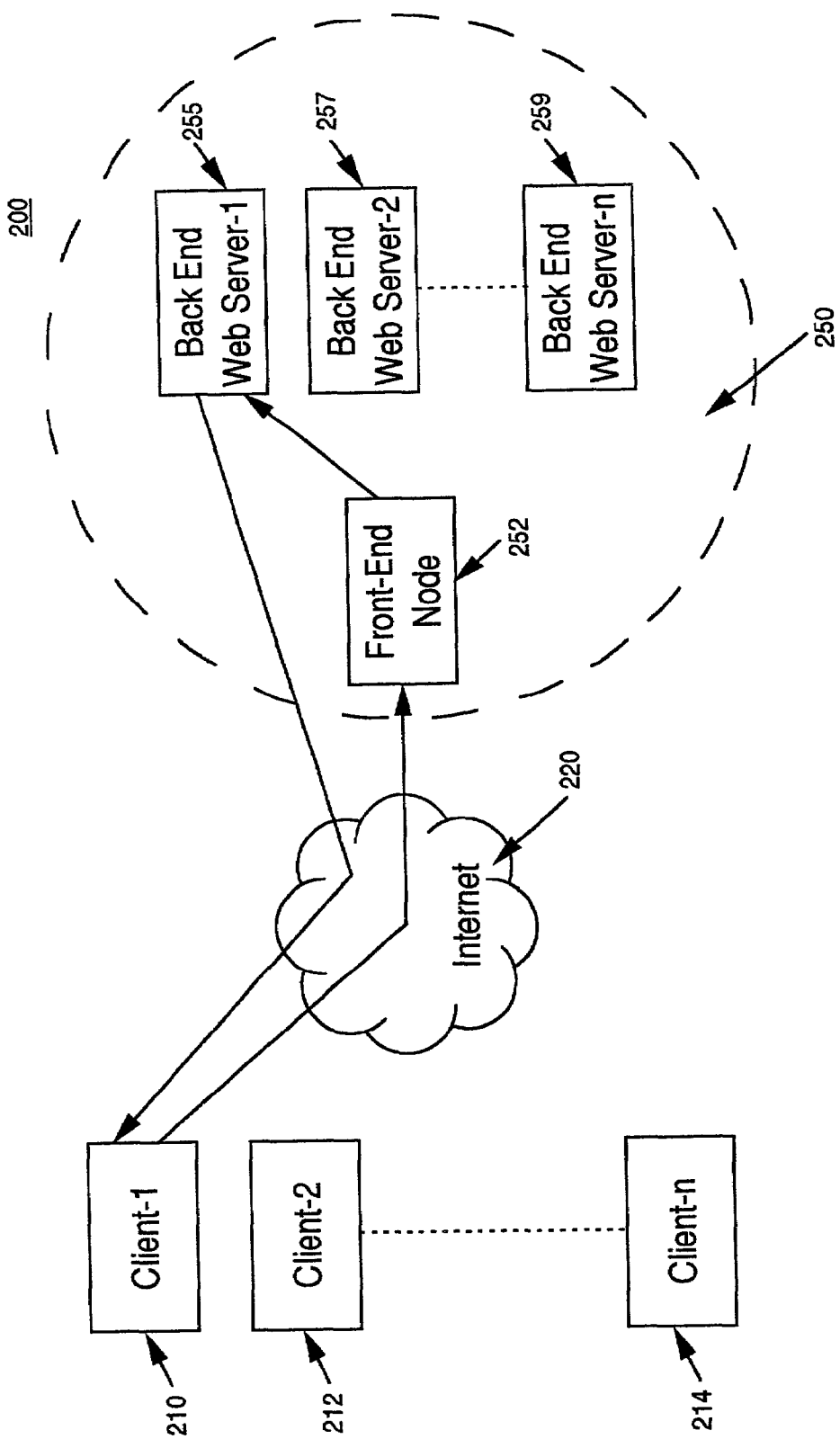
FIG. 2 illustrates a block diagram of an exemplary communication network environment including a front-end web server coupled to a plurality of back-end web servers and the Internet for implementing a modular Transmission Control Protocol (TCP) handoff design in a STREAMS-based Transmission Control Protocol internet protocol (TCP/IP) implementation, in accordance with one embodiment of the present invention.

The STREAMS-based front-end modular TCP handoff mechanism enables the forwarding of back-end web server responses directly to the clients without passing through the front-end. FIG. 2 illustrates an exemplary network 200 implementing the content-aware request distribution utilizing a front-end server approach for TCP handoff, in accordance with one embodiment of the present invention. FIG. 2 also is illustrative of the traffic flow between the clients through the internet 220 to the web site serviced by the web cluster 250.

Network 200 includes client-1 210, client-2 212, on up to client-n 214. The clients are coupled to the web cluster 250 via the internet 220. The web cluster includes a front-end node 252 that does not provide any web content, but distributes HTTP requests to a plurality of back-end web servers, such as, back-end web server-1 255, back-end web server-2 257, on up to back-end web server 259.

After the front-end node 252 establishes the connection with a client (e.g., client-1 210) and the request distribution decision is made, the established connection is handed off to the selected back-end web server to serve the request. The TCP state, related to the established connection, is migrated from the front end to the selected back-end web server. One benefit of TCP handoff mechanism is that the back-end web servers can send response packets directly to the client without routing outgoing packets back through the front-end node 252.

STREAMS-Based TCP/IP Implementation

STREAMS-based TCP/IP implementation offers a framework to implement the TCP handoff mechanism as plug-in modules in the TCP/IP stack, in accordance with one embodiment of the present invention.

The STREAMS modules provide the advantage of better portability. The STREAMS-based modules are relatively independent of the original internal TCP/IP modules. In other words, STREAMS-based TCP handoff modules do not change any data structures or field values maintained by the original TCP/IP modules. Further, all the interactions between TCP handoff modules and the original TCP/IP modules are messaged based, such that, no direct function calls are made. This enables maximum portability, so that designed TCP handoff modules can be ported to other STREAMS-based TCP/IP implementations very quickly.

Another advantage provided by the STREAMS-based modules is increased flexibility within the operating system. The TCP handoff modules may be dynamically loaded and unloaded as dynamically loadable kernel modules (DLKM) without service interruption. Improvements to the handoff mechanism are easily inserted as new TCP handoff modules into the kernel of an operating system without updating the operating system.

Furthermore, the STREAMS-based modules provide for increased efficiency when processing HTTP requests, especially in handing off TCP states from one node to another. The TCP handoff modules only peek into the TCP/IP message traffic. There is minimum functional replication of the original TCP/IP modules.

Also, the STREAMS-based modules allow for application transparency in the operating system. The TCP handoff mechanism operates at the kernel level within an operating system without any application layer involvement. Thus, no modifications at the application layer is necessary to perform TCP handoff. This is a valuable feature for applications where no source code is available.

Figure 3A:
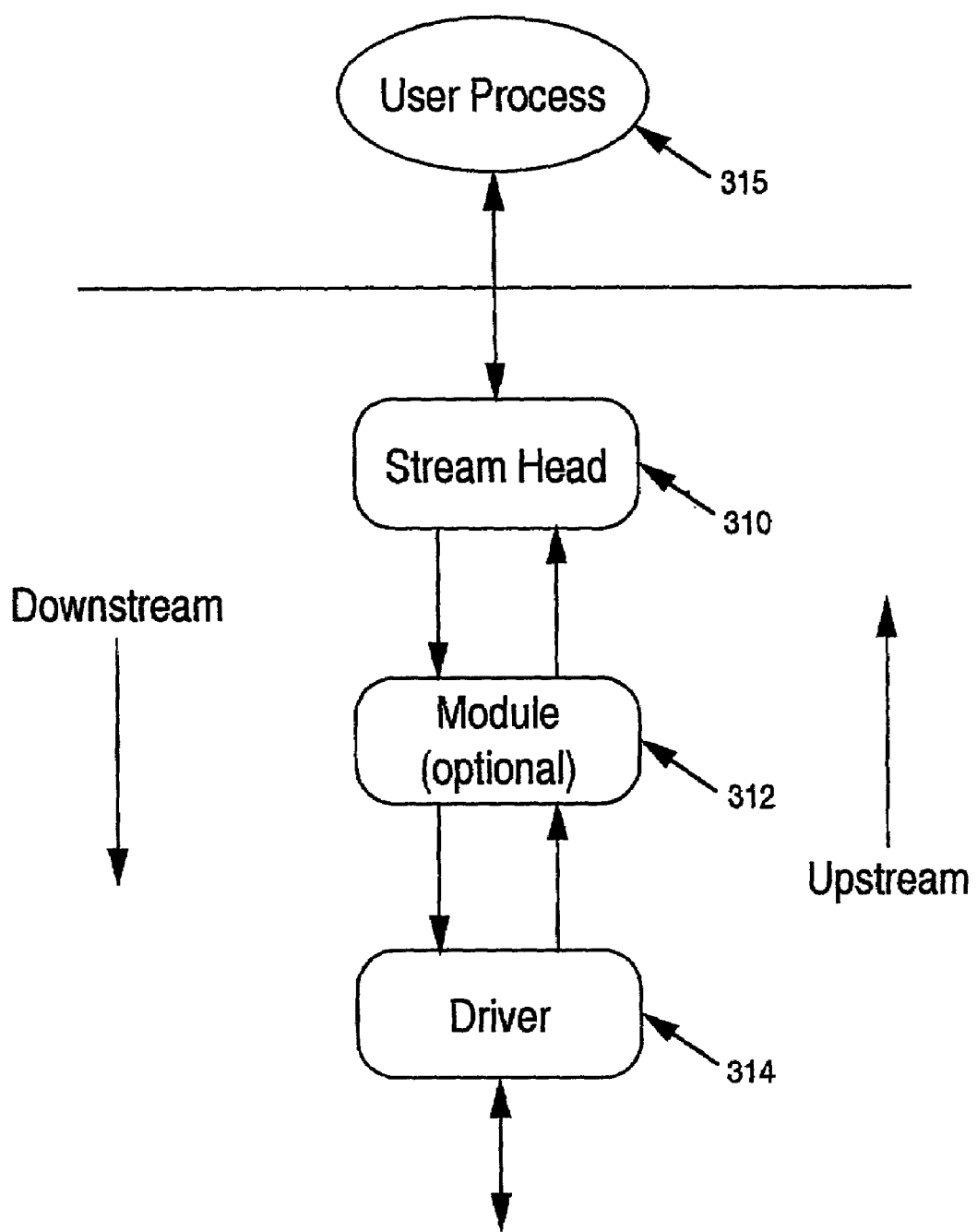
FIG. 3A illustrates a block diagram of an exemplary STREAM-based modular framework for TCP/IP implementation, in accordance with one embodiment of the present invention.

FIG. 3A illustrates a block diagram of a STREAMS-based modular framework for developing the communication services and the TCP handoff mechanism. Each stream generally has a stream head 310, a driver 314, and multiple optional modules 312 between the stream head 310 and the driver 314. These modules 312 exchange information through messages. Messages can flow in the upstream direction or the downstream direction.

Each module 312 has a pair of queues: write queue and read queue. When a message passes through a queue, the routine for this queue is called to process the message. The routine can drop a message, pass a message, change the message header, or generate a new message.

The stream head 310 is responsible for interacting with the user processes 315. The stream head 310 accepts requests from the user processes 315, translates them into appropriate messages, and sends the messages downstream. The stream head 310 is also responsible for signaling to the user processes module 315 when new data arrives or some unexpected event happens.

Figure 3B:
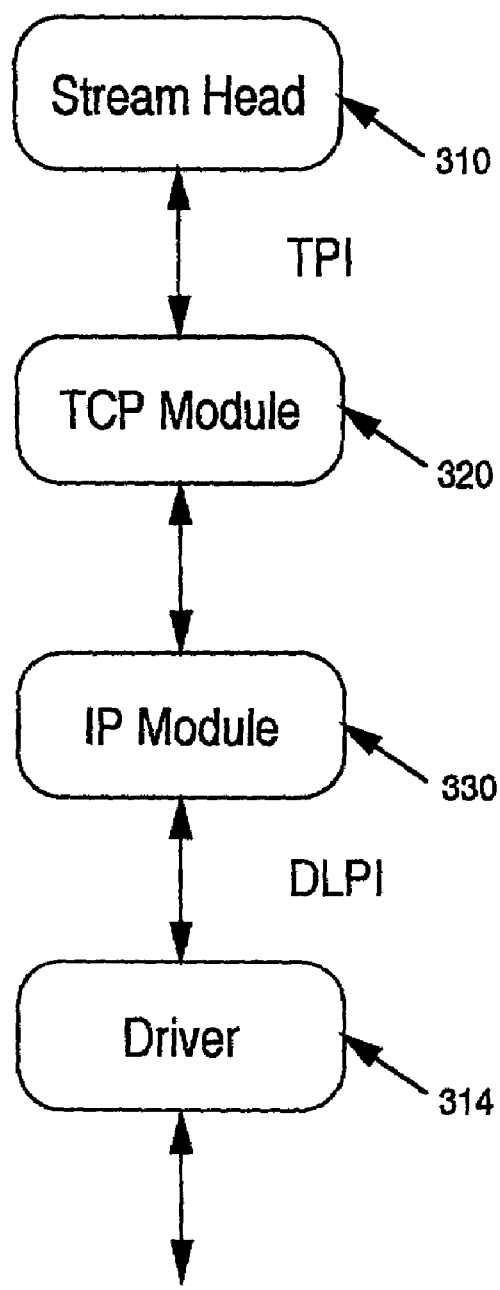
FIG. 3B illustrates a block diagram of the standard STREAMS-based modules used for TCP/IP implementation, in accordance with one embodiment of the present invention.

FIG. 3B illustrates a block diagram of the standard STREAMS-based modules used for TCP/IP STREAMS-based implementation, in accordance with one embodiment of the present invention. A transport provider interface (TPI) specification defines the message interface between the TCP module 320 and the stream head module 310. A data link provider interface (DLPI) specification defines the message interface between driver module 314 and the IP module 330. These two specifications, TPI and DLPI, can be implemented in individual STREAMS modules and define the message format, valid sequences of messages, and semantics of messages exchanged between these neighboring modules.

For example, when the TCP module 320 receives SYN request for establishing the HTTP connection, TCP module 320 sends a "T_CONN_IND" message upstream. Under the TPI specification, the TCP module 320 should not proceed until it gets the response from the application layer. However, in order to be compatible with BSD implementation-based applications, TCP module 320 continues the connection establishment procedure with the client. When the application decides to accept the connection, it sends the "T_CONN_RES" downstream on the listen stream. It also creates another stream to accept this new connection, and the TCP module 320 attaches a TCP connection state to this new stream. Data exchange continues on the accepted stream until either end closes the connection.

Web Site Cluster Design for a Front-End Architecture

As discussed previously, three main components comprise a web server cluster configuration in implementing a content-aware request distribution strategy: a dispatcher, a distributor, and a web server. The dispatcher implements the request distribution strategy and decides which web server will be processing a given request. The distributor interfaces with the client and implements the TCP handoff in order to distribute the client requests to a specific web server. The web server processes the client requests, or HTTP requests.

The HTTP protocol is stateless, in that each request is processed by the web server independently from the previous or subsequent request. However, in an e-commerce environment, the concept of a communication session defines a sequence of requests issued by the client and the responses to the request. For a communication session, it is important to maintain state information from previous interactions between a client and a server.

In one instance, state information allows for proper sequencing of data packets once they are received. In another instance, such state information might contain the content of the shopping cart or list of results from the search request. Thus, when the user is ready to make a purchase, or is asking for the next ten entries from the search list, the state information from the previous request should be retrieved. For efficient request processing and session integrity, it is desirable to send client requests to the same back-end web server. One of the popular schemes proposed for handling the state over the internet are cookies. Content-aware request routing provides a convenient mechanism to support session integrity, also known as a "sticky" session).

Figure 4:
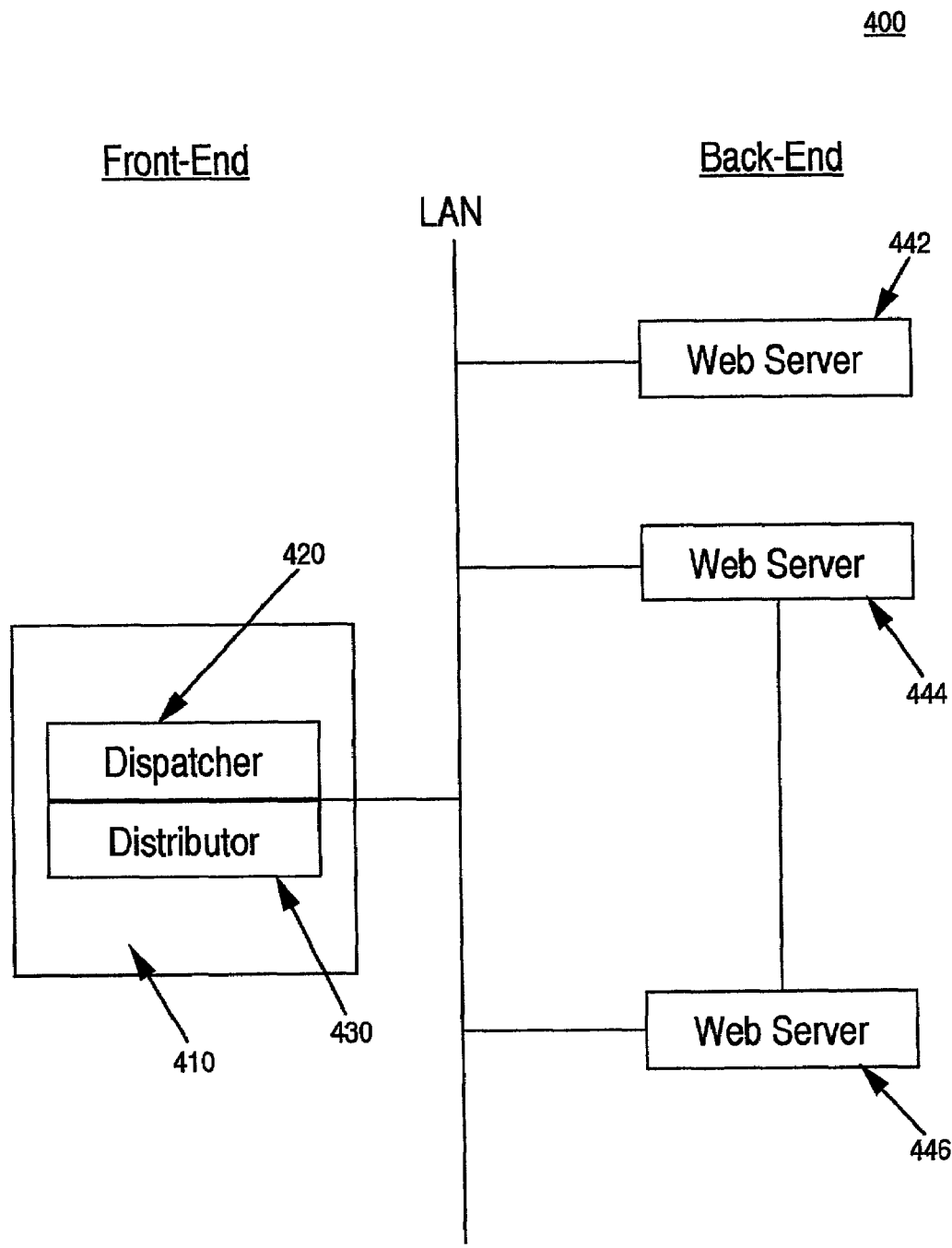
FIG. 4 illustrates a block diagram of an exemplary web server network environment including a front end server coupled to a plurality of back-end web servers through a local area network, in accordance with one embodiment of the present invention.

FIG. 4 shows a web server cluster network 400 to support an exemplary e-commerce site implementing a front-end modular TCP handoff design, in accordance with one embodiment of the present invention. In this architecture, the front-end node 410 has co-located the distributor functionality 430 and the dispatcher functionality 420 used to support the session integrity. For example, based on the cookie attached to an incoming HTTP session, the front-end node sends the HTTP request belonging to a particular communication session to the initially chosen, same back-end web server.

The specifics of the web cluster 400 illustrated in FIG. 4 is that the front-end node 410 and the back-end web server nodes (server-1 442, server-2 444, on up to server-n 446) have different functionalities. The front-end node 410 combines the functions of distributor and dispatcher. On the other hand, the back-end nodes perform as the web servers that process the HTTP requests and provide the web content.

The front-end node checks the cookie attached to an HTTP request for a particular communication session, and decides which back-end web server should process the request. The distributor module 430 in the front end node 410 always hands off the connection to the appropriate back-end web server, as the front-end node 410 never processes the request. As such, this network architecture 400 is defined as by the term "TCP always-handoff."

Thus, the content-aware front-end node 410 in the cluster network 400 shown in FIG. 4 maintains the communication session integrity mechanism. The front-end node 410 accepts the connection, checks the HTTP header, and hands-off the connection to the proper back-end web server. The front-end node does not service the HTTP request.

Modular Front-End TCP Handoff Design Architecture

The TCP always-TCP handoff design is optimized for always TCP handoff of TCP states. As such, the TCP always-handoff design is optimized to minimize the TCP handoff procedures for remote processing of HTTP requests.

In always-TCP handoff, there are two kinds of nodes, the dedicated front-end node and the back-end web servers. The purpose of the front-end node is to trigger the client to send the HTTP request, and then handoff the connection to the selected server. Also, the TCP handoff mechanism, as shown in FIG. 2, enables the forwarding of outgoing responses from the back-end web server nodes directly to the clients. Consequently, the front-end node is optimized to handoff the connection and forward the data as quickly as possible. The functionalities and the roles of the front-end and back-end web server nodes are different in this network architecture 200. As such, the set of STREAMS modules located the front-end and the back-end web servers provide different functionalities.

Figure 3C:
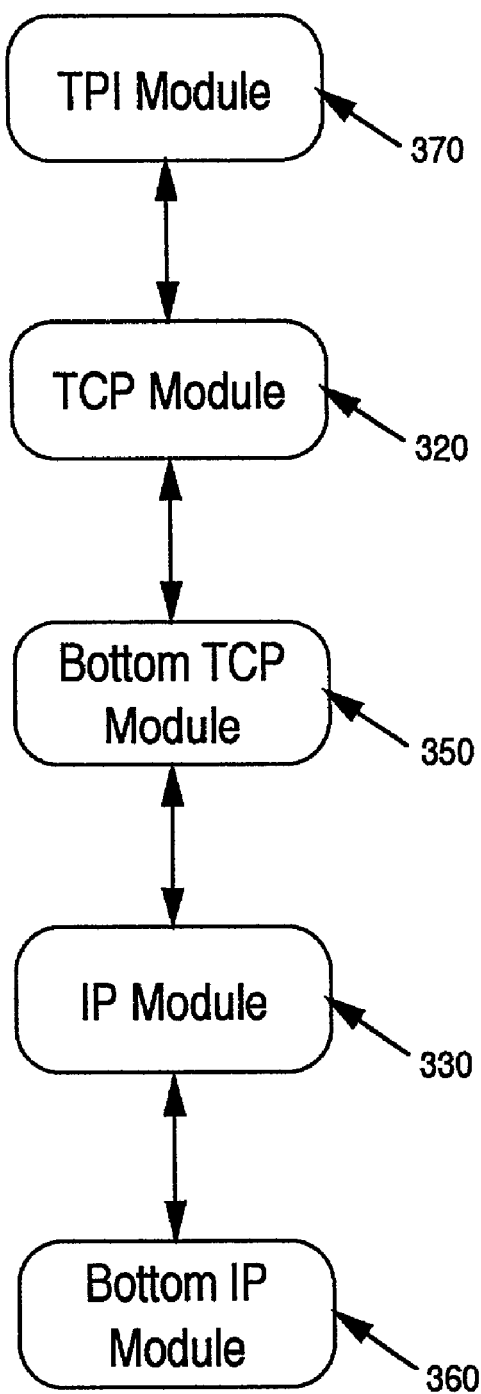
FIG. 3C illustrates a block diagram of new STREAMS-based plug-in modules used for TCP handoff in STREAMS-based TCP/IP implementation, in accordance with one embodiment of the present invention.

Two new modules are shown in FIG. 3C to implement the functionality of TCP handoff at the front-end node, in accordance with one embodiment of the present invention. According to the relative position in the existing TCP/IP stack located within the operating system of the front-end node, a bottom TCP ($BTCP_{FE}$) module 350 and a bottom IP ($BIP_{FE}$) module 360 are introduced. The $BTCP_{FE}$ module 350 is located under the $TCP_{FE}$ module 320 in the TCP/IP protocol stack. The $BIP_{FE}$ module 360 is located under the $IP_{FE}$ module 330 in the TCP/IP protocol stack. The TPI module 370 provides for the message interface between the TCP module 320 and the stream head module 310.

Figure 5:
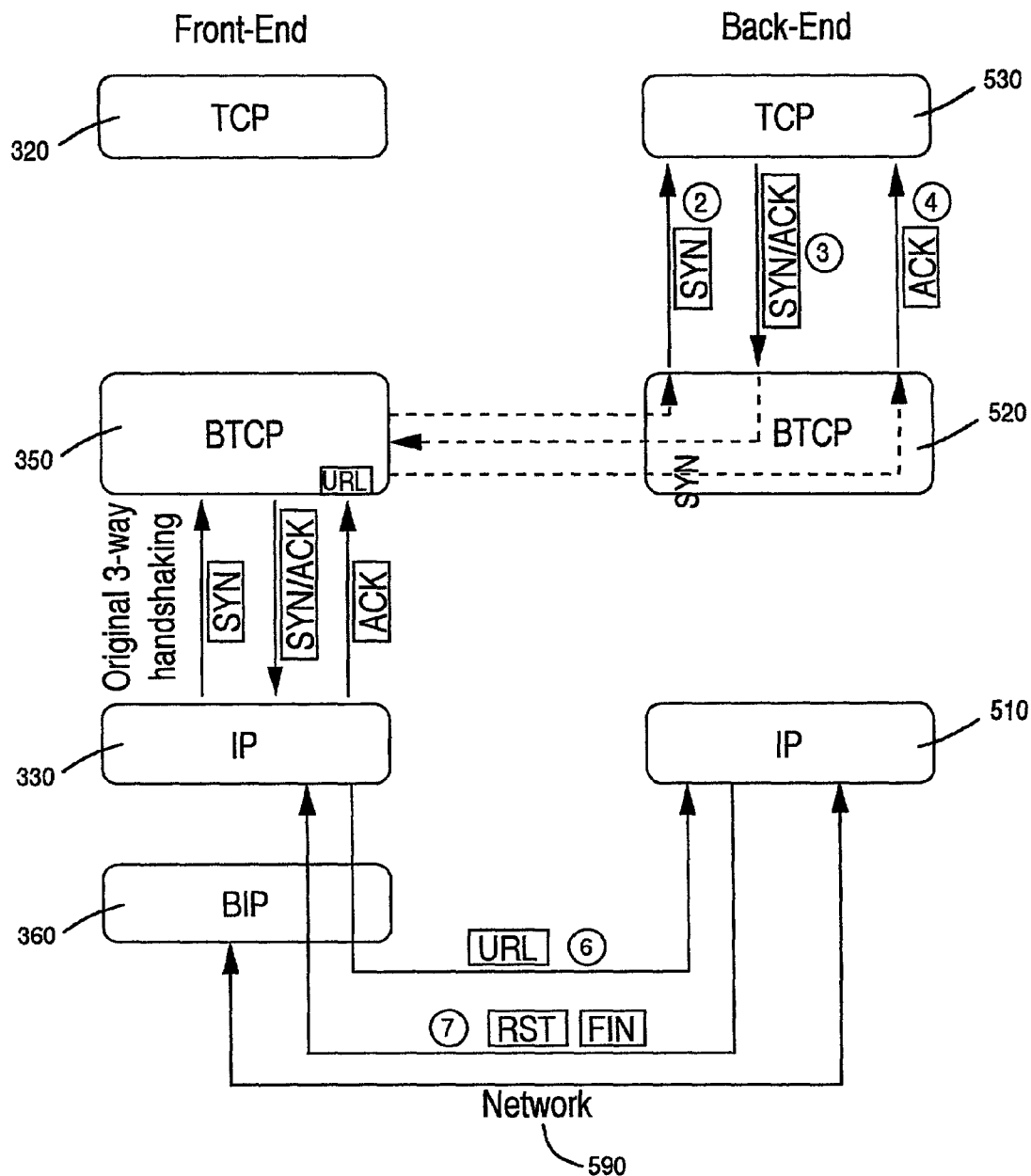
FIG. 5 illustrates a block diagram of an exemplary front-end network architecture that shows the request processing flow during a TCP handoff procedure, in accordance with one embodiment of the present invention.

Each of the back-end web servers have only one additional STREAMS $BTCP_{BE}$ module 520 that is located under a $TCP_{BE}$ module 530, as is shown in FIG. 5, in accordance with one embodiment of the present invention. An $IP_{BE}$ module 510 is also located in the TCP/IP protocol stack implemented at each of the back end web servers.

A network connection 590 provides further communication between nodes in the web cluster including the front-end node and the back-end web servers as described in FIG. 5. The network connection 590 can be over a local area network (LAN), a wide area network (WAN), or any suitable communication network including the Internet.

Figure 6:
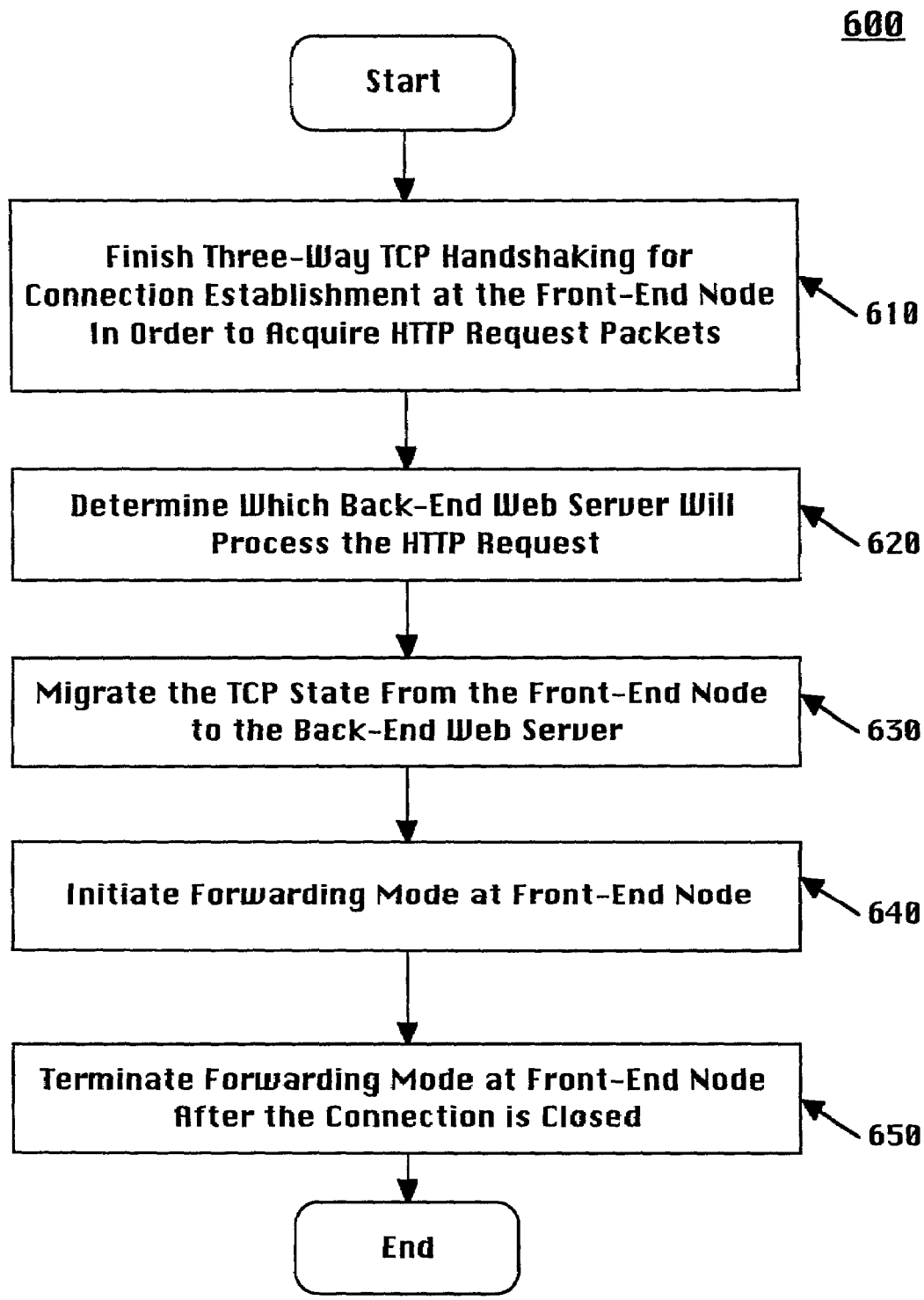
FIG. 6 is a flow diagram illustrating steps in a method for migrating TCP states from the front-end node to a selected back-end web server, in accordance with one embodiment of the present invention.

FIG. 6 is a flow chart 600 illustrating steps in a method for migrating TCP states from the front-end node to a selected back-end web server, in accordance with one embodiment of the present invention.

Flow chart 600 begins with the front-end node finishing the three-way TCP handshake protocol used for connection establishment, in step 610. A client web browser initiates a connection request with the front-end node to establish a communication session for the transfer of data contained within the content available at the web site serviced by the front-end node. The front-end node provides a virtual IP address for a web cluster that includes a plurality of back-end web servers that contain the content provided by the web site. The content may be partitioned between each of the back-end web servers with little or no duplication. The front-end node also receives the requested document in step 610.

In step 620 of flow chart 600, the front-end node makes the routing decision. After the HTTP request is received at the front-end node, the HTTP request is parsed for content. A back-end web server is selected by the front-end node based on the content of the HTTP request. The back-end web server is selected to process the HTTP request.

In step 630 of flow chart 600, the front-end node migrates the TCP state of the front-end node from the front-end node to the selected back-end web server. The connection from the client to the web cluster must be extended from the front-end node to the selected back-end web server. This is accomplished by migrating the initial state of the front-end node to the selected back-end. This is done through the TCP always-handoff modules at both the front-end and the back-end web servers. This process is transparent to the client. As such, the connection for the communication session extends from the client to the selected back-end web server.

Additionally, after successful TCP state migration, the front-end node enters a forwarding mode, in step 640. The front-end node forwards incoming data packets from the client to the selected back-end web server as quickly as possible.

In step 650 of flow chart 600, the front-end node terminates the forwarding mode and releases the related resources on the front-end node after the connection is closed.

Figure 7:
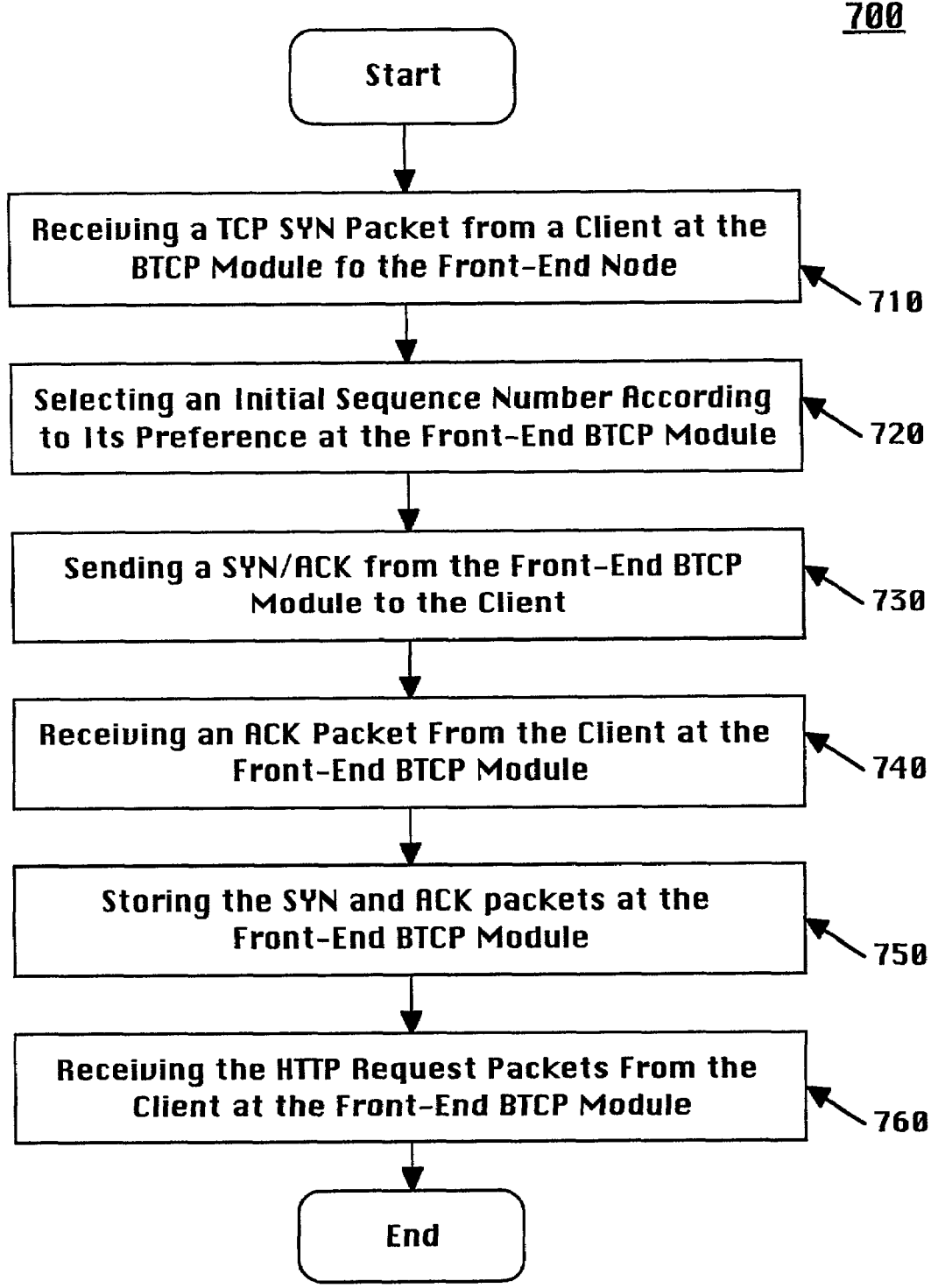
FIG. 7 is a flow diagram illustrating steps in a method for establishing a connection between a client and a front-end node, in accordance with one embodiment of the present invention.

FIG. 7 is a flow chart 700 illustrating steps in a method for establishing a connection setup between a client and a front-end node, in accordance with one embodiment of the present invention. The $BTCP_{FE}$ implements the connection setup function at the front-end node. Before the HTTP request is sent by the client to make a routing decision, the connection has to be established between the client and the front-end node. Packets are exchanged to establish the connection. After the connection is established, an HTTP request is passed from the client to the front-end node.

Since internet traffic follows a TCP/IP communication protocol, a TCP/IP SYN packet is sent from the client to the front-end node. The front-end node provides the virtual IP address for a web site that includes a web cluster architecture including a front-end node and a plurality of back-end web servers, such as the network architectures shown in FIGS. 2 and 4.

The TCP/IP SYN packet arrives at the $BTCP_{FE}$ module in step 710 of flow chart 700. At this stage, the $BTCP_{FE}$ allocates a connection structure corresponding to each connection request upon receiving the TCP/IP SYN packet from the client.

In step 720 of flow chart 700, the $BTCP_{FE}$ selects an initial sequence number according to its preference. In step 730, the $BTCP_{FE}$ sends a TCP/IP SYN/ACK packet with the initial sequence number that, among other variables, indicates the initial TCP state of the $BTCP_{FE}$ module.

In step 740 of flow chart 700, the $BTCP_{FE}$ module receives an TCP/IP ACK packet from the client. It is at this point that the connection is established between the client and the front-end node. During this process, the $BTCP_{FE}$ module emulates the TCP state transition and changes its TCP state accordingly.

In step 750 of flow chart 700, the $BTCP_{FE}$ module stores the connection packets (e.g., the SYN, SYN/ACK, and the ACK packets). These packets are replayed at a selected back-end web server to extend the connection for the communication session to the selected back-end web server.

In step 760 of flow chart 700, after the connection is established, the client sends the HTTP request to the front-end node. The HTTP request packets are intercepted and parsed by the BTCP$_{FE}$ module and a back-end web server is selected based on the content of the request. It is important to note that all of the above activities in flow chart 700 occur without the involvement of the TCP module in the original operating system at the front-end node.

Once a back-end web server is selected to service the HTTP request, the connection for the communication session established by the HTTP request must be extended to the selected back-end web server. It is difficult to replicate this TCP state at the TCP module of the back-end web server directly. The TPI specification does not support schemes by which a new half-open TCP connection with a predefined state can be opened.

On the other hand, one embodiment of the present invention creates the half-open TCP connection by replaying the original connection packets to the TCP module (TCP$_{BE}$) at the selected back-end web server by the BTCP$_{FE}$. In essence, the BTCP$_{FE}$ acts as the client in some sense (see FIG. 5).

Figure 8:
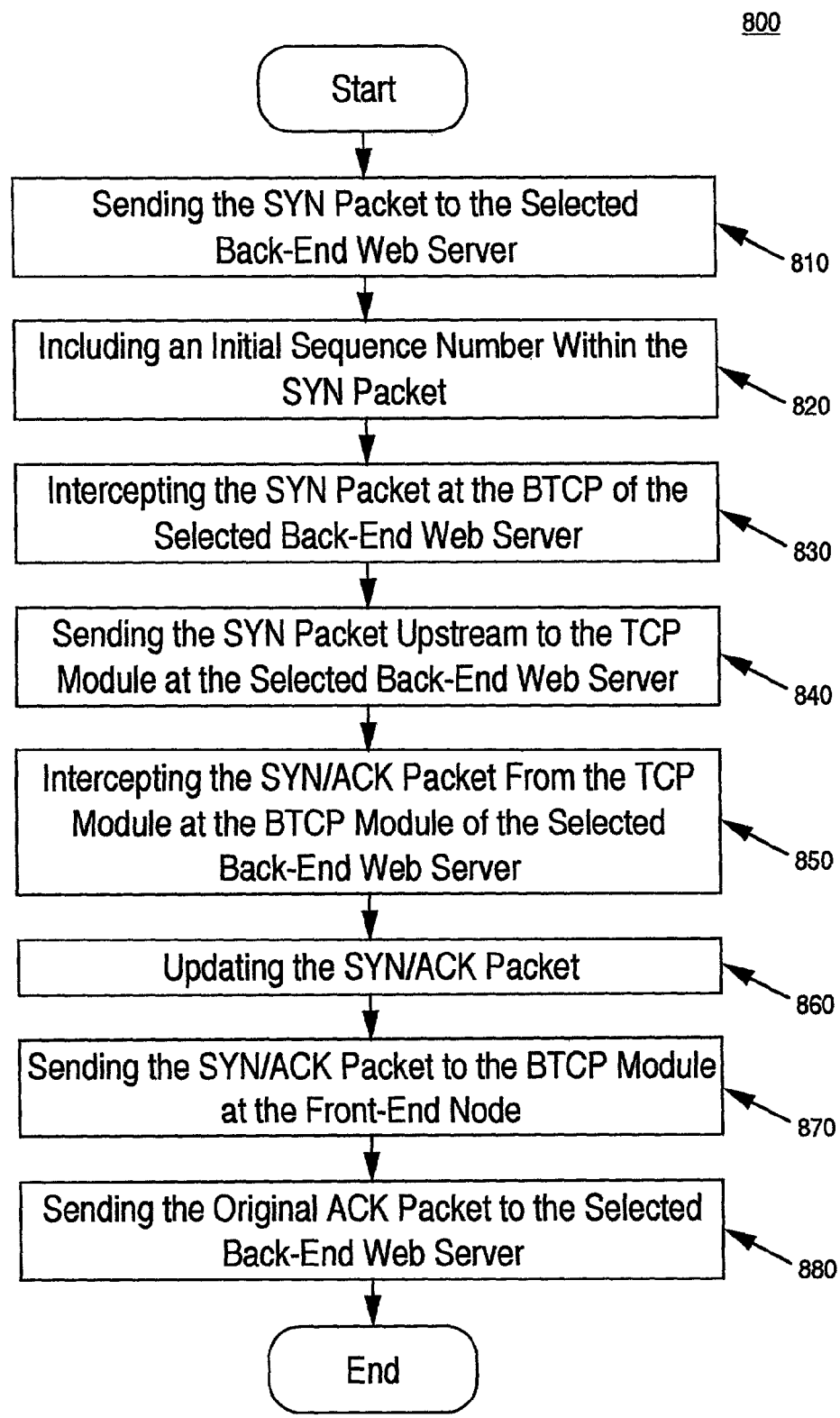
FIG. 8 is a flow diagram illustrating steps in a method for extending a connection from a front-end node to a selected back-end web server, in accordance with one embodiment of the present invention.

FIG. 8, is a flow chart 800 that in conjunction with FIG. 5 illustrate steps in a method for extending the connection setup to a selected back-end web server, in accordance with one embodiment of the present invention.

In step 810 of flow chart 800, the first replayed TCP/IP SYN packet initiates the handoff process (see also step 2, FIG. 5). The BTCP$_{FE}$ module uses the connection establishment packets stored during the connection setup phrase and sends the TCP/IP SYN packet to the selected back-end web server. The destination address is changed in the TCP/IP SYN packet to reflect the selected back-end web server.

This TCP state migration occurs transparently to the client. Additionally, the connection is extended to the selected back-end web server. In other words, no separate connection is made between the front-end node and the selected back-end web server. To the selected back-end web server, it appears as if the connection sequence originated from the client instead of the front-end node. It is only the handoff modules that understand the correct addresses for the handoff procedure.

The TCP state migration is done by replaying the packets between the front-end node and the selected end web server. Since all Internet traffic is handoff traffic, the TCP/IP SYN packet arriving at the listening port of the selected back-end web server indicates a handoff request is initiated.

In step 820 of flow chart 800, an initial sequence number is included within the TCP/IP SYN packet. This initial sequence number, and any other state information that may be included, indicates the initial TCP state of the BTCP$_{FE}$ module.

The TCP/IP SYN packet is intercepted by the BTCP$_{BE}$ module in step 830 of flow chart 800. The handoff protocol used by the handoff modules allows the bottom TCP (BTCP$_{BE}$) module at the back-end web server to read the initial sequence number, understand the initial state of the BTCP$_{FE}$ module, and to update outgoing packets from the selected back-end web server to reflect the proper TCP state at the front-end node in the communication session.

In step 840 of flow chart 800, the TCP/IP SYN packet is sent upstream (see also step 2, FIG. 5) to the TCP (TCP$_{BE}$) module at the selected back-end web server. The TCP$_{BE}$ responds with a TCP/IP SYN/ACK packet and sends this downstream, back to the originating source, the client.

In step 850, the TCP/IP SYN/ACK packet is intercepted by the BTCP$_{BE}$ module (see also step 3, FIG. 5). In step 860, the BTCP$_{BE}$ module changes the destination address to the front-end node, and updates the TCP sequence number of the TCP/IP SYN/ACK packet to reflect the proper state of the front-end node used for establishing and maintaining the communication session.

In step 870, the TCP/IP SYN/ACK packet is sent to the front-end node where the BTCP$_{FE}$ module intercepts the packet. In step 880, The BTCP$_{FE}$ module then sends the updated ACK packet, used for establishing the connection between the client and the front-end node, back to the selected back-end web server (see also step 4, FIG. 5). The HTTP request is forwarded over the network as in step 6 of FIG. 5.

In another embodiment of the present invention, the initial sequence number of the front-end node is provided for in the original TCP/IP SYN packet that is sent to the selected back-end web server when extending the connection.

After handoff is processed successfully, the BTCP$_{FE}$ module notifies the bottom IP (BIP$_{FE}$) module at the front-end node to switch to a forwarding mode for this connection. The BIP$_{FE}$ continues to forward any packets on this connection until the forward session is closed. Packet forwarding should be done as quickly as possible. In this configuration, it might be better to forward the packet on top of the device driver. Additionally, data forwarding may happen at Layer 2 or Layer 3, depending on the cluster configuration.

When the forwarding packets need to traverse a router or across a WAN, the packet's destination address may be changed to the selected back-end web server's IP address. In return, packets coming from the selected back-end web server may update the source IP address to duplicate the front-end node's virtual IP address.

Further, the BIP$_{FE}$ module updates the destination IP address for incoming packets to the selected server's IP address, and sends the packet upstream. The IP$_{FE}$ forwards the packet according to its routing tables to the selected back-end node. The BIP$_{BE}$ module also intercepts the incoming packets and manipulates the TCP header anyway to update the initial sequence number and the TCP checksum.

The handoff connection is closed in the following fashion. The BTCP$_{BE}$ intercepts the TCP control packets (e.g., packets with RST or FIN flags) and sends it to the BTCP$_{FE}$ (see step 7, FIG. 5). The BTCP$_{FE}$ records the connection progress, updates, and relays the packets to the client. As usual, data traffic goes directly to the client. Additionally, the front-end sees two way traffic and may keep track of the handoff connection status and close the connection in a timely manner.

While the methods of embodiments illustrated in flow charts 600, 700, and 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for a front-end modular Transmission Control Protocol (TCP) handoff design in a STREAMS-based Transmission Control Protocol Internet protocol (TCP/IP) implementation, is thus described. While the present invention has been described in particular embodiments, it should be appreciated that the present invention should not be construed as limited by such embodiments, but rather construed according to the below claims.

What is claimed is:

1. In a communication network, a method of TCP state migration comprising the steps of:
   a) establishing a communication session between a client and a front-end node at a first bottom TCP (BTCP) module located below a first TCP module in a first operating system at said front-end node, said front-end node accessing a plurality of back-end web servers forming a web server cluster that contains content;

b) receiving a HTTP request from said client at said first BTCP module;

c) parsing said HTTP request to determine which back-end web server, a selected back-end web server, in said plurality of back-end web servers can process said HTTP request, said selected back-end web server not said front-end node;

d) extending said communication session to said selected back-end web server by handing-off an initial TCP state of said first BTCP module to said selected back-end web server;

e) sending said HTTP request to said selected back-end web server;

f) switching a bottom IP (BIP) module at said front-end node to a forwarding mode, wherein packets received at said BIP module from said client are forwarded to said selected back-end web server, said BIP module located below an IP module at said front-end node; and g) terminating said communication session at said front-end node after said HTTP request is fully processed.

2. The method as described in claim 1, wherein said content is partially replicated between each of said plurality of back-end web servers.

3. The method as described in claim 1, wherein said back-end web server includes a second BTCP module that is located below a second TCP module in a second operating system.

4. The method as described in claim 1, wherein said initial TCP state is associated with said communication session, said communication session established for the transfer of data contained within said content to said client.

5. The method as described in claim 4, wherein said step d) comprises the further steps of:

sending a SYN packet to said selected back-end web server, said SYN packet intercepted by a second BTCP module, said SYN packet originally sent from said client to said front-end node in requesting said communication session, said SYN packet stored at said first BTCP module;

including an initial sequence number within said SYN packet that enables said second BTCP module to understand a proper TCP state of said first BTCP module in said communication session;

receiving a SYN/ACK packet from said selected back-end web server, said SYN/ACK packet updated by said second BTCP module to reflect said proper TCP state of said first BTCP module; and sending an ACK packet from said first BTCP module to said selected back-end web server, said ACK packet originally sent from said client to said front-end node in establishing said communication session.

6. The method as described in claim 1, wherein said method comprises the further step of:

sending response packets from said selected back-end web server to said client in a communication path that does not include said front-end node by changing headers of said response packets such that it appears that the source of said response packets is said first BTCP in its proper TCP state.

7. The method as described in claim 1, wherein step g) comprises the further steps of:

intercepting TCP control packets from a second TCP module located at said selected back-end web server at said second BTCP module;

sending said TCP control packets to said first BTCP module from said second BTCP module;

sending said TCP control packets to said client from said first BTCP module; and terminating said communication session at said front-end node and said back-end web server.

8. The method as described in claim 1, wherein said front-end node and said plurality of back-end web servers comprise a web site, said front-end node providing a virtual IP address for said web site.

9. The method as described in claim 8, wherein said front-end node, and said plurality of back-end web servers are coupled together by a local area network.

10. The method as described in claim 8, wherein said front-end node and said plurality of back-end web servers are coupled together by a wide area network.

11. In a communication network, a method of TCP state migration comprising the steps of:

a) receiving a request from a client for establishing a communication session at a first bottom TCP (BTCP) module located at a front-end node, said front-end node accessing a plurality of back-end web servers containing content, wherein said content is partially replicated between each of said plurality of back-end web servers, said communication session established for the transfer of data contained within said content to said client;

b) establishing said communication session between said client and said first BTCP module, said first BTCP module located below a first TCP module in a first operating system at said front-end node;

c) receiving a HTTP request from said client at said first BTCP module;

d) parsing said HTTP request to determine which back-end web server, a selected back-end web server, in said plurality of back-end web servers contains said data in order to process said HTTP request, said selected back-end web server not said front-end node;

e) extending said communication session to said selected back-end web server by handing-off an initial TCP state of said first BTCP module to a second BTCP module located at said selected back-end web server, said initial TCP state associated with said communication session between said client and said first BTCP module, said second BTCP module located below a second TCP module in a second operating system at said selected back-end web server;

f) sending said HTTP request to said selected back-end web server;

g) switching a bottom IP (BIP) module in said front-end node to a forwarding mode, wherein packets, from said client, received at said front-end node are intercepted by said BIP module and forwarded to said selected back-end web server, said BIP module located below an IP module in said front-end node, said BIP module changing destination IP addresses of said packets to said selected back-end web server and h) terminating said communication session after said HTTP request has been fully processed.

12. The method as described in claim 11, wherein step e) comprises the further steps of:

e1) storing a SYN packet sent from said client to said front-end node, said SYN packet requesting said communication session in step a);

e2) storing an ACK packet sent from said client to said front end node in establishing said communication session;

e3) sending said SYN packet to said selected back-end web server so that it appears that said SYN packet originated from said client;

e4) sending said initial TCP state to said second BTCP module, including an initial sequence number, that enables said second BTCP module to understand a proper TCP state of said first BTCP module for said communication session;

e5) receiving a SYN/ACK packet at said first BTCP module from said second TCP module, said SYN/ACK packet updated by said second BTCP module to reflect said proper TCP state at said first BTCP for said communication session; and e6) sending said ACK packet to said selected back-end web server to extend said communication session to said selected server.

13. The method as described in claim 12, wherein step e4) includes the further step of including said initial sequence number in said SYN packet.

14. The method as described in claim 11, wherein said method comprises the further step of sending response packets from said back-end web server to said client in a communication path that does not include said front-end node, by changing headers of said response packets such that it appears that the source of said response packets is said front-end node with said proper TCP state.

15. The method as described in claim 11, wherein step h) comprises the steps of:
   intercepting TCP control packets from said selected back-end web server at said second BTCP module;
   sending said TCP control packets to said first BTCP module from said second BTCP module;
   sending said TCP control packets to said client from said first BTCP module; and
   terminating said communication session at said front-end node and said back-end web server.

16. The method as described in claim 15, wherein said TCP control packets include a RST flag and a FIN flag.

17. The method as described in claim 11, wherein said method bypasses the first TCP module.

18. The method as described in claim 11, wherein said front-end node, and said plurality of back-end web servers comprise a web site, said front-end node providing a virtual IP address for said web site.

19. The method as described in claim 18, wherein said front-end node, and said plurality of back-end web servers are coupled together by a local area network.

20. The method as described in claim 18, wherein said front-end node and said plurality of back-end web servers are coupled together by a wide area network.

21. The method as described in claim 11, wherein said content is partitioned between each of said plurality of back-end web servers.

22. A communication network for TCP state migration comprising:
   a client;
   a front-end node coupled to said client by said communication network, said front-end node including a front-end bottom TCP (BTCP) module located below a front-end TCP module in a first operating system, and a bottom IP (BIP) module located below an IP module in said first operating system; and
   a plurality of back-end web servers including a selected back-end web server, said plurality of back-end web servers containing content that is partitioned between each of said plurality of back-end web servers, each of said plurality of back-end web servers coupled to said front-end node through said communication network, each of said plurality of back-end web servers including a back-end bottom TCP module located below a back-end TCP module.

23. The communication network as described in claim 22, wherein said front-end BTCP module establishes a communication session with said client for the transfer of data contained within said content to said client.

24. The communication network as described in claim 23, wherein said front-end BTCP module parses a HTTP request from said client in order to determine which of said plurality of back-end web servers, a selected back-end web server, contains said data in order to process said HTTP request.

25. The communication network as described in claim 23, wherein said front-end BTCP module extends said communication session to said selected back-end web server by handing-off an initial TCP state of said front-end BTCP module to a second BTCP module located at said selected back-end web server, said initial TCP state associated with a proper TCP state for said front-end BTCP module in said communication session, said front-end BTCP module further forwarding packets, including said HTTP request, from said client after successfully handing-off said initial TCP state.

26. The communication network as described in claim 25, wherein said second BTCP module understands said proper TCP state of said front-end BTCP module in said communication session and modifies headers in response packets from said selected back-end web server to reflect said proper TCP state.

27. The communication network, as described in claim 26, wherein said second BTCP module located at said selected back-end web server sends said response packets from said selected back-end web server to said client in a communication path that does not include said front-end node by changing headers of said response packets such that it appears the source of said response packets is said front-end node.

28. The communication network as described in claim 25, wherein said BIP module changes a destination address in forwarding said packets from said client.

29. The communication network as described in claim 22 wherein said content is partially replicated between each of said plurality of back-end web servers.

* * * * *

UNITED STATES PATENT AND TRADEMARK OFFICE
CERTIFICATE OF CORRECTION

| | |
|---|---|
| PATENT NO. | : 7,689,710 B2 |
| APPLICATION NO. | : 09/880632 |
| DATED | : March 30, 2010 |
| INVENTOR(S) | : Wenting Tang et al. |

It is certified that error appears in the above-identified patent and that said Letters Patent is hereby corrected as shown below:

In column 11, line 39, delete "selected end" and insert -- selected back-end --, therefor.

Signed and Sealed this

Eighth Day of June, 2010

David J. Kappos
*Director of the United States Patent and Trademark Office*